United States Patent [19]
Chambers et al.

[11] Patent Number: 5,597,873
[45] Date of Patent: Jan. 28, 1997

[54] SUPERABSORBENT POLYMERS AND PRODUCTS THEREFROM

[75] Inventors: Douglas R. Chambers, Chesapeake; William G-J Chiang, Virginia Beach; Guy T. Woodrum, Chesapeake, all of Va.

[73] Assignee: Hoechst Celanese Corporation, Somerville, N.J.

[21] Appl. No.: 450,267

[22] Filed: May 25, 1995

Related U.S. Application Data

[63] Continuation of Ser. No. 226,160, Apr. 11, 1994, abandoned.
[51] Int. Cl.$^6$ .................................................... C08F 8/14
[52] U.S. Cl. ............................................................ 525/330.1
[58] Field of Search ............................................. 525/330.1

[56] References Cited

U.S. PATENT DOCUMENTS

| | | | |
|---|---|---|---|
| 4,507,438 | 3/1985 | Obayashi et al. | 525/119 |
| 4,880,868 | 11/1989 | Le-Khac | 524/549 |
| 5,002,986 | 3/1991 | Fujiura et al. | 524/47 |

*Primary Examiner*—Edward J. Cain
*Attorney, Agent, or Firm*—Hugh C. Crall

[57] ABSTRACT

A surface crosslinked superabsorbent polymer composition, a process for its preparation and articles made therefrom wherein said superabsorbent composition is prepared by surface crosslinking the polymerization product of a carboxyl or carboxylate group containing monomer with a crosslinker solution comprising water, $C_3$–$C_6$ diol and a crosslinking compound having at least two functional reactive groups with the carboxyl or carboxylate groups of said polymerization product.

20 Claims, No Drawings

SUPERABSORBENT POLYMERS AND PRODUCTS THEREFROM

This is a continuation of application(s) Ser. No. 08/226,160 filed on Apr. 11, 1994 now abandoned.

BACKGROUND OF THE INVENTION

Technical Field

This invention is directed to improved aqueous fluid absorbent polymers, a process for their manufacture and absorbent articles made therefrom. In particular, the invention is directed to superabsorbent polymers having improved fluid absorption properties, which provide superior performance when incorporated into absorbent articles.

Background

The present invention is directed to water-insoluble, crosslinked, high molecular weight polymers capable of absorbing and retaining large quantities of aqueous fluids. These polymers are well known in the art by various names such as superabsorbent polymers, hydrogels, hydrocolloids, water absorbent hydrophilic polymers, etc. For the purpose of this description the term, "superabsorbent polymer(s)" is used to describe such materials.

Exemplary superabsorbent polymers are crosslinked, partially neutralized polyacrylic acid (see U.S. Pat. No. 4,654,039), a crosslinked, partially neutralized starch-acrylic acid graft polymer (U.S. Pat. No. 4,076,663), a crosslinked, partially neutralized copolymer of isobutylene and maleic anhydride (U.S. Pat. No. 4,389,513), a saponification product of vinyl acetate-acrylic acid copolymer (U.S. Pat. No. 4,124,748), a hydrolyzate of acrylamide polymer or acrylamide copolymer (U.S. Pat. No. 3,959,569) or a hydrolyzate of an acrylonitrile copolymer (U.S. Pat. No. 3,935,099). The teachings of the above patents are hereby incorporated by reference.

Superabsorbent polymers find use in many fluid absorption applications with the primary use being in the field of personal care products such as diapers, sanitary napkins, adult incontinent products, absorption pads for medical uses, etc. The largest market for superabsorbent polymers is found in disposable diapers for infants; see e.g. U.S. Pat. Nos. 3,669,103; 3,670,731 or 4,654,039.

Superabsorbent polymers are prepared by polymerizing an ethylenically unsaturated monomer or alkali metal salt of such monomers or mixtures thereof and crosslinking the polymer either during and/or after polymerization. Preferably the ethylenically unsaturated monomer is water soluble. However, monomers which become water soluble by hydrolysis may be employed.

Exemplary water soluble monomers are those containing carboxyl groups, carboxylic acid anhydride groups, carboxylic acid salt groups, sulfonic acid groups, sulfonic acid salt groups, hydroxyl groups, amide groups, amino groups and quaternary ammonium salt groups. An extensive listing of suitable monomers is found in U.S. Pat. No. 4,076,663 at col. 2, lines 6–68 and col. 3, lines 1–12; the teachings of which are hereby incorporated by reference.

In the event the monomer is an acid group containing monomer, the monomer may be partially neutralized prior to polymerization or the polymer neutralized subsequent to polymerization with an alkali metal such as sodium or potassium or a compound such as ammonium hydroxide. Additionally, the monomer may also be polymerized in the presence of a preformed polymer to produce a graft polymer. Exemplary preformed polymers are starch, polyvinyl alcohol, carboxymethyl cellulose and other such polymers. Various methods are described in the literature and are well known for the preparation of superabsorbent polymers. Generally, these methods involve some variant of an aqueous solution polymerization method or an inverse suspension polymerization method. U.S. Pat. No. 5,145,906 illustrates the solution polymerization method and U.S. Pat. No. 4,666,975 the inverse suspension method. Polymers made by either method may be used in this invention.

The literature is replete with examples of attempts to improve upon the performance of superabsorbent polymers in absorbent articles. U.S. Pat. No. Re 32,649 claims that high gel volume, high gel strength, low extractable content polymers give improved performance. U.S. Pat. No. 5,147,343 describes an absorbent article composed of a fiber matrix containing a high AUL (absorbency under load) superabsorbent polymer having improved performance properties; i.e. less leakage in diapers. This AUL performance correlation is more fully described in the scientific literature, see e.g. "The Concept of Superabsorbent Polymer" by Dr. F. Masuda, Pira Fibrametrics Program, Paper 13 (Dec. 1987). Another example is U.S. Pat. No. 5,145,906 which discloses improved performance using a superabsorbent polymer having certain minimum polymer properties.

A known technique for preparing superabsorbent polymers having improved performance properties is to crosslink the polymer particle's surface by a post crosslinking treatment. Crosslinking the polymer chains on the surface of the superabsorbent particles reduces the tendency of the particles to gel block and agglomerate when wetted with aqueous liquid. Gel blocking is a reduction in fluid absorption capacity caused by the formation of gel on the polymer particle surface which blocks the transfer of fluid from the polymer surface to its interior. This gel can also causes polymer particles to agglomerate which further reduces fluid absorption capacity. Various prior art patents describe the post treatment of superabsorbent particles to surface crosslink the polymer chains in the vicinity or near the particles' surface. Illustrations of such teachings follow.

U.S. Pat. No. 4,666,983 describes surface crosslinking a superabsorbent polymer using 0.001 to 10 parts by weight of a difunctional crosslinking agent. The patent does not disclose using any carrier solvent for the crosslinker. Surface crosslinking agents are broadly disclosed such as polyhydric alcohols, polyglycidyl ethers, polyfunctional amines and polyfunctional isocyanates.

U.S. Pat. Nos. 4,507,438 & 4,541,871 disclose surface crosslinking a superabsorbent polymer with a difunctional compound (a crosslinker) in the presence of 0.01 to 1.3 parts by weight of water and 0.1 to 50 parts by weight of an inert solvent per 100 parts of polymer. The crosslinker may be present in the amounts of 0.005 to 5% by weight. The patents discloses using a broad class of crosslinking agents including glycidyl ethers, haloepoxies, aldehydes and isocyanates with ethylene glycol diglycidyl ether being the preferred crosslinker. A multitude of inert solvents are described as useful in the invention. The solvents include polyhydric alcohols with ethylene glycol, propylene glycol and glycerine enumerated as preferred polyhydric alcohols. A mixed solvent system is used to control the penetration of the crosslinker into the particles interior. The use of more than 1.3 parts of water and less 0.1 parts of inert solvent per part superabsorbent polymer are taught to be undesirable.

U.S. Pat. No. 5,140,076 discloses surface crosslinking using a solvent comprising 0–50% water and 0–60% solvent. The reaction is conducted in a lined, high speed mixer where the liner is required to have a certain contact angle. The patent discloses the use of polyhydric alcohol, diglycidyl ether, polyarizidene, urea, amine and ionic crosslinkers.

U.S. Pat. No. 5,164,459 discloses a process for surface crosslinking very similar to the above described '459 patent using a polyhydric alcohol. crosslinker. The reaction is carded out according to a specific equation to crosslink the resin's surface and produce desired properties.

EPO 0 509,708 discloses surface crosslinking a superabsorbent polymer with a polyhydroxy compound using a water based coating solution which may contain a nonionic surfactant and optionally a water soluble solvent. The process of the disclosure is said to provide a superabsorbent having high absorption capacities, low extractables and high gel toughness.

U.S. patent application Ser. No. 08/002346 filed Jan. 6, 1993 discloses a surface crosslinking process in which a mixed water/solvent system is used. The solvent is selected from an alkylene oxide of a monofunctional alcohol, a salt of an organic acid and a lactam. A broad class of crosslinkers is disclosed including polyamine - polyamide epichlorohydrin crosslinkers.

U.S. Pat. No. 4,666,975 describes an improved superabsorbent polymer having a saline absorption quantity of 40–90 gms per gram of polymer, an absorption rate of at least 8 ml per 0.3 grams of polymer and a gel strength of 33 to 200 g/cm$^2$. This superabsorbent polymer is said to possess a crosslinking density gradient in the polymer particles wherein the crosslinking density is higher at the polymer particle surface than inside the particle.

U.S. Pat. No. 5,002,986 discloses agglomerating and surface crosslinking fine (<300 microns) superabsorbent particles to provide superabsorbent polymer composition having a high absorbency rate.

U.S. Pat. No. 5,229,466 discloses surface crosslinking superabsorbent polymer using an aqueous solution of a N-(hydroxyalkyl)β-(meth)-alanine ester and a water miscible organic diluent.

Other patents which have described the surface crosslinking of superabsorbent polymers are U.S. Pat. Nos.: 3,202,731; 4,043,952; 4,127,944; 4,159,260; 4,251,643; 4,272,514; 4,289,814; 4,295,987; 4,500,670; 4,587,308; 4,732,968; 4,735,987; 4,755,560; 4,755,562; 4,758,617; 4,771,105; 4,820,773; 4,824,901; 4,954,562; 4,973,632; 4,985,518; 5,026,800.

This invention is directed to improved superabsorbent polymer compositions, a process for their preparation, and absorbent articles made from such compositions. The process of the invention provides a superabsorbent polymer with superior fluid absorption capacity, absorbency under pressure, high gel strength and low extractables.

SUMMARY OF THE INVENTION

The invention is improved superabsorbent polymers having superior fluid absorbency, a process for their preparation and absorbent articles made therefrom. The superabsorbent polymers of the invention have high fluid absorption capacity, high absorbency under load, low gel blocking, low dust content and provide absorbent articles having improved dryness and low leakage properties.

The superabsorbent polymers of this invention have a 0.6 psi absorbency under load (AUL) value of at least 20 g/g, preferably at least about 25 g/g and a centrifuge retention (CRET) value of at least about 35 gm/gm. These superabsorbent polymers exhibit improved dryness and less leakage when incorporated into absorbent articles such as diapers.

The improved superabsorbent polymers of the invention are prepared from a base polymer which is a lightly crosslinked, partially neutralized polymerization product of a carboxyl or carboxylate group monomer or a carboxylic acid anhydride group monomer wherein said polymerized monomer is present in an amount of from about 50 to about 99.5 mole percent. The preferred carboxyl group containing monomer is acrylic acid.

The based polymer is lightly crosslinked as is evidenced by an absorbency under load at 0.3 psi of 15 g/g or less, a centrifuge retention (CRET) property of at least 35 g/g, preferably 40 g/g or more, and a free polymer extractable content of less than 10 percent. According to the process of the invention, the base polymer is surface crosslinked with an aqueous crosslinker solution comprising water, a diol selected from a $C_3$ to $C_6$ diol and a crosslinking compound. The water and diol components of the crosslinker solution comprises from about 1.0 to about 6.0 percent by weight based upon the weight of base polymer, preferably about 1.5 to about 5.5 percent and the crosslinker solution's surface tension should be less than about 55 dynes per cm.

The crosslinking compound is selected from organic compounds which contains two or more groups capable of reacting with the carboxy or carboxylate groups of the polymer and is used in an amount of from about 0.001 to about 3, preferably about 0.1 to about 1.0 percent by weight based upon the weight of the polymer. Exemplary surface crosslinkers are compounds containing epoxy, epichlorohydrin, aziridinyl and azetidinium groups; preferably the crosslinker has a molecular weight of at least 200.

The crosslinker solution is uniformly blended onto to the surface of the superabsorbent particles and the mixture heated to crosslink the polymer chains on or in the vicinity of the surface of the superabsorbent particles.

DESCRIPTION OF THE PREFERRED EMBODIMENTS

The ability of a superabsorbent polymer to absorb aqueous fluids generally decreases as the load or pressure on the polymer increases. The superabsorbent polymers of this invention have a 0.6 psi absorbency under load (AUL) value of at least 20 g/g, preferably 25 or higher and a centrifuge retention value of at least about 35 g/g. Superabsorbent polymers having a 0.6 psi AUL value of 20 g/g will exhibit an AUL at 0.3 psi of 30 g/g or more. In a preferred embodiment of this invention, the superabsorbent polymers will have a 0.3 psi AUL in excess of 30 g/g and a 0.6 psi AUL value of 25 or more. These polymers exhibit improved dryness and less leakage when incorporated into absorbent articles such as diapers.

The superabsorbent polymers of this invention are prepared from monoethylenically, unsaturated, water soluble carboxyl or carboxylic acid anhydride containing monomers and the alkali metal and ammonium salts thereof wherein said monomers comprise 50 to 99.9 mole percent of said polymer. Exemplary monomers include acrylic acid, methacrylic acid, maleic acid, fumaric acid, maleic anhydride and the sodium, potassium and ammonium salts thereof. The preferred monomer is acrylic acid.

A base polymer is prepared from such water soluble monomers to provide a lightly crosslinked, partially neutralized superabsorbent polymer having a high aqueous fluid absorption capacity as exemplified by high centrifuge retention properties. The definition of superabsorbent polymer properties used herein and the applicable test methods are set forth in the test method section of this disclosure and the examples.

The base polymer useful in this invention is characterized by the following properties:

| Absorbency Under Load @ 0.3 psi | ≦ | 15 g/g |
|---|---|---|
| Centrifuge Retention | ≧ | 35 g/g |
| Extractables Content | ≦ | 10% (wgt) |

Monoethylenically, unsaturated monomers are polymerized in the presence of an internal crosslinking compound to provide a lightly crosslinked base polymer wherein the crosslinking is substantially uniform throughout the polymer particles. These internal crosslinkers are well known in the art. Suitable crosslinkers are those compounds having two or more groups capable of reacting with the monoethylenically unsaturated monomers and which are water soluble or soluble in a water monomer mixture. The internal crosslinking compound may be selected from a polyunsaturated monomer such as divinylbenzene, a compound having at least two functional groups which are reactive with the monoethylenically unsaturated monomer such as ethylenediamine, a compound having at least one unsaturated bond and at least one reactive functional group such as glycidyl acrylate.

Exemplary internal crosslinkers are: tetraallyloxyethane, N,N'-methylene bisacrylamide, N,N'-methylene bismethacrylamide, triallylamine, trimethylol propane triacrylate, glycerol propoxy triacrylate, divinylbenzene, N-methylol acrylamide, N-methylolmethacrylamide, glycidyl methacrylate, polyethylene polyamines, ethyl diamine, ethyl glycol, glycerine and the like. Preferred internal crosslinking monomers are those containing at least two allyl groups, most preferably four allyl groups. A preferred internal crosslinker is tetraallyloxyethane. The amount of internal crosslinker employed in the invention will depend on the internal crosslinker and the polymerization method. Generally the amount of internal crosslinker will vary from about 0.005% to about 1.0 mole percent based on moles of ethylenically unsaturated monomer.

Optional components used in the preparation of the superabsorbent polymers of this invention are water soluble hydroxy group containing polymers, such as polysaccharides and vinyl or acrylic polymers. Examples of water soluble polysaccharides are starches, water soluble celluloses and polygalactommans. Suitable starches include the natural starches, such as sweet potato starch, potato starch, wheat starch, corn starch, rice starch, tapioca starch and the like. Processed or modified starches, such as dialdehyde starch, alkyl-etherified starch, allyl-etherified starch, oxyalkylated starch, aminoethyl-etherified starch, and cyanomethyl-etherified starch are also suitable. Polyvinyl alcohol and polyvinyl alcohol copolymers are also suitable.

The water-soluble celluloses useful in this invention are those obtained from such sources as wood, stems, bast, seed fluffs and the like which are then deriviatized to form hydroxyalkyl cellulose, carboxymethyl cellulose, methyl cellulose and the like.

Suitable polygalactomannans are guar gum and locust bean gums as well as their hydroxyalkyl, carboxyalkyl, and aminoalkyl derivatives. Water soluble vinyl and acrylic polymers include polyvinyl alcohol and poly(hydroxyethyl acrylate). The preferred polysaccharide for use in this invention is natural starch, such as wheat starch, corn starch and alpha starches. These optional preformed hydroxy containing polymers may be used in an amount from about 1–15 percent, preferably about 1 to 10 percent, most preferably about 1–5 percent.

The superabsorbent polymers in this invention may be prepared by well known polymerization methods. The polymerization reaction is conducted in the presence of redox initiators and thermal initiators. The redox initiators can be used as the primary initiator with the thermal polymerization initiators being used if desired to reduce the free monomer content of the final polymerization product below 0.1 percent by weight. Optionally, thermal initiators or redox initiators may be used as the sole initiator system. Examples of different initiator systems are found in U.S. Pat. No. 4,497,930 which discloses a two component initiator system comprising a persulfate and a hydroperoxide and U.S. Pat. No. 5,145,906 which discloses a three component initiator system; i.e. redox system plus thermal initiator.

Any of the well known water soluble reducing agents and oxidizing agents can be used in this invention as the redox initiator. Examples of reducing agents include such compounds as ascorbic acid, alkali metal sulfites, alkali metal bisulfites, ammonium sulfite, ammonium bisulfite, alkali metal hydrogen sulfite, ammonium hydrogen sulfite, ferrous metal salts, e.g., ferrous sulfates, sugars, aldehydes, primary and secondary alcohols, and the like.

Oxidizing agents include such compounds as hydrogen peroxide, alkali metal persulfate, ammonium persulfate, alkylhydroperoxides, peresters, diacryl peroxides, silver salts, and the like. A particularly preferred redox initiator pair is ascorbic acid and hydrogen peroxide. The reducing agent is used in an amount of about $2 \times 10^{-5}$ to about $2.0 \times 10^{-2}$ mole percent based on moles of acrylic acid. The amount of oxidizing agent used will vary from about $2.0 \times 10^{-3}$ to about 1.1 mole percent, based on moles of acrylic acid.

In order to ensure complete polymerization of the unsaturated monomer and the crosslinking monomer, a thermal initiator can be included in the polymerization process. Useful thermal initiators am the "azo" initiators, i.e. compounds which contain the —N=N— structure. Any of the azo compounds which have solubility in water or in a monomer-water mixture and which have a 10 hour half life at 30° C. or above can be used. Examples of useful azo initiators are 2,2'-azobis(amidino) propane dihydrochloride, 4,4'-azobis (cyanovaleric acid), 4,4'-butylazo-cyanovaleric acid, 2,2'-azobis(isobutyronitrile ), and the like. Other thermal initiators include the persulfates and hydroperoxides when used in the absence of a reducing agent e.g., sodium, potassium and ammonium persulfates, t-butylhydroperoxide and the like. A preferred azo initiator for use in this invention is 2,2'-azobis(amidinopropane) dihydrochloride. The thermal initiators are used in the amount of 0 to about 1 mole percent based on the weight of unsaturated monomer.

The base polymer may be prepared by the solution or the inverse suspension polymerization method or any suitable bulk polymerization method. Preferably, the base polymer is prepared according to the solution polymerization method. The solution polymerization and inverse polymerization methods are well known in the art; see for example U.S. Pat. Nos. 4,076,663; 4,286,082; 4,654,039 and 5,145,906 which describe the solution polymerization method and U.S. Pat. Nos. 4,340,706; 4,497,930; 4,666,975; 4,507,438 and 4,683,274 which describe the inverse suspension method. The teachings of these patents are hereby incorporated by reference.

In the solution polymerization method, the water soluble monomer is polymerized at a monomer concentration from about 5 to about 30 percent in aqueous solution at a temperature from about 5° C. to about 150° C. depending upon the polymerization initiator system. A detailed description of the solution polymerization method is given in U.S. Pat. No. 5,145,906; the teachings of which are hereby incorporated by reference.

In the inverse suspension polymerization process, the unsaturated monomer in an aqueous solution (about 35 to 60 percent monomer to 65 to 40 percent water) is dispersed in an alicyclic or aliphatic hydrocarbon suspension medium in the presence of a dispersing agent such as a surfactant or protective colloid such as polyvinyl alcohol. A surfactant having a HLB value of 8–12 such as a sorbitan fatty acid ester ether may employed as the dispersing agent. The inverse suspension polymerization method is described in detail in U.S. Pat. No. 4,340,706; the teachings of which are hereby incorporated by reference.

The carboxylic acid groups of the unsaturated monomer used in the polymerization have to be partially neutralized. Suitable neutralizing agents include an alkali such as sodium hydroxide, ammonium hydroxide, potassium hydroxide or the like, and the appropriate degree of neutralization is 50–98 mole percent; preferably 60–75 percent. The degree of neutralization should be at least 50 mole percent. Low neutralization levels (less than 50 mole percent) give superabsorbent polymers having low absorbency properties.

The base polymer is prepared by either the solution or inverse polymerization method dried and screened to provide a superabsorbent particle with an appropriate particle size distribution and particle shape. Generally the superabsorbent particle size distribution should be between 100 and 850 microns, preferably between 150 and 600 microns. Large particles over 850 microns are undesired since they do not always feed well in machinery used to make absorbent articles, they tend to cause the absorbent article to have an abrasive feel and they do not function well from an absorption efficiency standpoint.

Small fine particles below 100 microns are not desired because they gel block. Particles below 10 microns are not desired because they dust and present an industrial hygiene problem. Surprisingly the products of this invention have a low tendency to dust as evidenced by their low airborne particle count. Airborne particles are not desired from an industrial hygiene standpoint because they can be inhaled or respirated by workers in manufacturing operations and caused lung irritation.

The base superabsorbent polymer is treated with a crosslinker solution containing from about 0.5 to about 3.5 weight percent water, from about 1.0 to 2.5 weight percent of a water miscible solvent selected from a $C_3$ to $C_6$ diol and a crosslinker having at least two functional groups that can react with the carboxyl, carboxylate or other reactive groups in the superabsorbent polymer chain to crosslink the polymer chains on or in the vicinity of the surface of the superabsorbent polymer particles. The term "diol" is intended to mean a dihydroxy aliphatic compound which may be a linear or branched compound, (a glycol). The term "surface crosslinking" used in this description and the claims hereof is used to describe this process of crosslinking the polymer chains on or in the vicinity of the particle's surface. The terms, "surface crosslinker" and "surface crosslinker solution" are likewise used to describe the crosslinking compound and the solution used to effect this surface crosslinking process. The crosslinking compound is used in an amount of from about 0.01 to about 3 weight percent, preferably 0.1% to 1.5% and most preferably about 0.25% to 1% based upon the weight of the superabsorbent polymer. The surface crosslinker may be selected from diglycidyl ethers, haloepoxy, isocyanate, aziridinyl, azetidinium group containing compounds, polyamine, polyamine-polyamide, polyamine-epichlorohydrin adducts and amine-polymer-epichlorohydrin adducts and the like. Preferred crosslinkers are the higher molecular weight diglycidyl ether compounds of at least 200 and the polymeric-epichlorohydrin adducts having a molecular weight average in excess of 2000.

Exemplary surface crosslinkers are poly (ethylene glycol) diglycidyl ethers, poly (propylene glycol) diglycidyl ethers, epichlorohydrin substituted compounds, methyl-epichlorohydrin substituted compounds, hexamethylene diisocyanate, triethylene triamine, polyethylene amine, 2,2-bishydroxymethylbutanol-tris[3-(1-azindinyl)propionate], polyamine epichlorohydrin adducts, polyethylene-polyamine-epichlorohydrin adducts, and the like.

The preferred surface crosslinkers are the higher molecular weight diglycidyl ether compounds, polyamide (polyamide-polyamine) epichlorohydrin adducts, polyamine epichlorohydrin adducts and amine polymer epichlorohydrin adducts. Polyamide-epichlorohydrin adducts are prepared by reacting epichlorohydrin with the polycondensation product of a polyalkylene polyamine with a polycarboxylic acid such as diethylene triamine with a dibasic acid such as adipic acid. Polyamine epichlorohydrin adducts are made by condensing a polyalkylene polyamine directly with epichlorohydrin. These adducts include polyalkylene polyamines which are linked together with dihalides to form higher polyamines before reacting them with epichlorohydrin. Amine polymer epichlorohydrin adducts include resins in which the monomeric amine is polymerized to a polyamine precursor which is then alkylated and reacted with epichlorohydrin. They include amines substituted polymers of vinyl, allyl, acrylate or epoxy monomers. The epichlorohydrin adducts whether the polymer is a polyamide, a polyamine or an amine polymer react with the epichlorohydrin by different routes. If the amino group in the polymer chain is a primary amine, two epichlorohydrin molecules reacted with the nitrogen and form a disubstituted chlorohydroxypropyl substituted amine group. Secondary amine groups react with epichlorohydrin to form a tertiary aminochlorohydrin group which cyclizes to form a reactive 3-hydroxyazetidinium salt moiety. This is a preferred reactive group. Tertiary amine groups react with epichlorohydrin to form a glycidyl; (2,3 epoxypropyl) ammonium salt. Preferably the reactive group is an azetidinium moiety. However, these adducts may contain a mixture of chlorohydroxypropyl, epoxy and azetidinium groups. Preferably the epichlorohydrin adducts have a molecular weight of at least 2,000; preferably 300,000 to 500,000 and wherein at least 50 mole percent of the reactive groups in the adduct are the azetidinium group. A preferred polymer is one in which about 90% of the substitution is in the form of an azetidinium group and about 10% as an epoxide group. Exemplary products are Reten® 204LS and Kymeme® 736 epichlorohydrin adducts; available from Hercules Inc., Wilmington, Del. These products are sold as an aqueous solution of the reactive epichlorohydrin adduct. The Reten® 204LS product is available as a 15% aqueous solution and the Kymeme® 736 product as a 38% aqueous solution.

The surface crosslinker solution should have a surface tension not greater than about 55 dynes per cm; preferably not greater than about 50 dynes per cm; e.g. about 40 to about 50 dynes per cm. In the event the surface tension of the crosslinker solution is higher than about 55 dynes per cm; the surface crosslinked polymer has inferior absorbency as evidenced by a low 0.6 psi AUL value. While not being bound to any theory, it is believed that when the surface tension of the crosslinker solution is higher than about 55 dynes per cm, the solution is not uniformly distributed on the surface of the polymer particles and a lower absorbency value results. Optionally, a surfactant may be used to reduce the surface tension of the crosslinker solution.

The desired surface tension is achieved by adding the $C_3$ to $C_6$ dihydroxy compound to water component of the crosslinker solution to achieve a surface tension below about 55 dynes/cm range. The amount of each solvent is determined by simple experimentation. Generally the crosslinker has a negligible effect on the surface tension of the crosslinker solution. The diols useful in the invention are propylene glycol, butylene glycol, pentanediol and hexanediol. Ethylene glycol was found to be an undesired solvent because it tends to swell the superabsorbent polymer particles and their surfaces becomes tacky which results in undesired particle agglomeration. In addition, ethylene glycol is undesirable because of its toxicity and biodegradability properties. The $C_3$ to $C_6$ diol is used in an amount of from about 1 percent by weight to about 2.5 percent by weight based upon the weight of superabsorbent polymer; preferably about 1 to about 2 percent by weight. The water component of the crosslinker solution comprises about 0.5 to 3.5 percent by water based upon the weight of the polymer, preferably about 1.5 to 2.0 percent.

The total amount of crosslinker solution used depends upon the type of equipment and the method used to coat the base polymer with the surface crosslinking solution. Generally the amount of crosslinker solution should be about 1.5% minimum based on the weight of the polymer. The crosslinker solution is applied to the base polymer particles in a manner such that the solution is uniformly distributed on the surface of the base polymer particle. Any of the known methods for dispersing a liquid can be used; preferably by dispersing the crosslinker solution into fine droplets; e.g. by use of a pressurized nozzle or a rotating disc. Uniform crosslinker dispersion on the base polymer can be achieved in a high intensity mechanical mixer or a fluidized mixture which suspends the base polymer in a turbulent gas stream. Methods for the dispersion of a liquid onto the superabsorbent base polymer's surface are known in the art; see for example U.S. Pat. No. 4,734,478; the teachings of which are hereby incorporated by reference; in particular column 6, line 45 to column 7, line 35.

Exemplary commercially available equipment for conducting the crosslinker solution dispersion step of the invention are high speed variable intensity paddle mixers such as the "Turbulizer" mixer of the Bepex Corporation, Rolling Meadows, Ill. or the high speed variable intensity vertical mixer sold by Bepex under the tradename, "Turboflex". These machines are generally operated in a continuous manner using a short residence time in the order of 2 seconds to 2 minutes, typically 2–30 seconds. Dispersion may be effected batchwise in a high intensity mixer such as a Henschel mixer or in liquid-solid V-blender equipped with a liquid dispersion device. In any event, whether a batchwise or continuous dispersion method is used, simple experimentation can be conducted to determine the best process conditions for the particular machine employed in the process. Preferably, the surface crosslinker is coated onto the polymer particles under high intensity mixing conditions.

After effecting dispersion of the surface crosslinker on the base polymer particle the crosslinking reaction is effected and the polymer particle dried. The crosslinking reaction may be effected at a temperature from about 70° C. to about 150° C.

TEST METHODS

The following test methods were used to determine the properties of the superabsorbent polymers described herein.

Absorbency Under Load (AUL) at 0.3 psi

This test is designed to determine the absorbency under load of a superabsorbent material. The amount of saline (0.9% wt/% NaCl aqueous solution) absorbed with the weight applied to the polymer indicates the effectiveness of the polymer's absorbency in a diaper system under the weight of a baby.

Absorbency under load is measured using a plastic petri dish with elevating rods and a 1.241""OD×0.998""ID× 1.316"" long plexiglass tube with a wire net (100 mesh) at the bottom of the tube. The particle size of the test samples is between 30 to 50 mesh, (through 30 and retained on 50).

A test sample, 0.160±0.01 g is weighed out and recorded as $S_1$. The sample is placed in the plastic tube and is spread evenly over the wire net. A 100 g weight and a disc are placed on the sample. The assembly (polymer sample, tube, disc and weight) is weighed and recorded as $W_1$. The assembly is then placed in a petri dish containing 40 ml 0.9% saline aqueous solution. After one hour of absorption, the assembly is removed from petri dish and excess saline blotted from the bottom. The assembly is weighed again and this value recorded as $W_2$. Absorbency under load (AUL) is equal to $(W_2-W_1)/S_1$ and is express in g/g.

Absorbency Under Load (AUL) at 0.6 psi

The absorbency under load at 0.6 psi is determined in the same manner as the above described absorbency under load at 0.3 psi except a 200 gram weight is used instead of the 100 gram weight.

Surface Tension

An adequate amount of liquid is transferred into sample holding cup (a Fisher Surface Tensiomat Model 21) and then the sample cup is placed onto the sample table of the tensiometer. A clean platinum-iridium ring is placed in the calibrated tensiometer and the sample table is raised until the platinum-iridium ring is below the surface of the liquid. After the ring has been submerged in fluid for about 30 seconds, the torsion arm is released so it hangs freely and the reference arm is adjusted to be parallel with the line on the mirror of the tensiometer. The ring is slowly raised at a constant rate. The reference arm is maintained parallel to the line on the mirror by lowering the sample cup when necessary. When the ring breaks free from the fluid surface, the number on the front dial is of the tensiometer is recorded. This is the surface tension in dynes/cm. The measurement is conducted at ~23° C., repeated three times and the average value reported.

Centrifuge Retention Capacity (CRET)

This test is designed to measure the amount of saline solution retained inside a superabsorbent polymer when under a specific centrifuge force.

Approximately 0.200 grams of superabsorbent polymer are placed into a sealable tea bag (7.5 cm×6.5 cm) and the tea bag sealed. The tea bag and polymer are immersed in a 0.9% saline solution for 30 minutes and then centrifuged for three minutes at 1600 rpm on a 21.6 cm diameter centrifuge. The weight difference before centrifuging and after is the amount of saline solution absorbed by polymer gel which is divided by original dry polymer weight and this value is the centrifuge retention capacity of the polymer expressed in g/g.

The following examples illustrate the preparation of the superabsorbent polymers of the invention and their preparation. These examples are intended to be illustrative and are not intended to limit the scope of the invention or the claims. In this description (unless otherwise specified) percent values are weight percent and molecular weight of a polymeric compound is weight average molecular weight. Surface tension measurements and values are made and reported at 23° C.

EXAMPLE 1

This example illustrates the preparation of a base polymer having a 0.3 psi AUL of 15 g/g or less and centrifuge retention value of 40 g/g.

Into a 4-liter reaction vessel under a nitrogen atmosphere are added 816 grams of acrylic acid, 306 grams of an eight-percent starch solution, 4.5 grams of tetraallyloxyethane and 2840.2 grams of demineralized water. The mixture is sparged with nitrogen and cooled to 10° C. and 16.32 grams of 0.1% aqueous hydrogen peroxide solution, 12.24 grams of 0.1% aqueous ascorbic acid solution and 4.76 grams of 10% aqueous 2,2-azobis(amidino)propane dihydrochloride solution are added to the reaction vessel.

The polymerization reaction is initiated and the reaction temperature increases to 60° C. from the heat of the reaction. The reaction is continued for 6 hours at 60° C. The reaction product is a gel which is chopped into pieces. The chopped reaction gel is neutralized to about 70 mole percent with 656.6 grams of 50 percent aqueous sodium hydroxide. The gel is chopped three more times to uniformly mix and neutralized the gel. The gel is then dried on a rotary drum dryer at 150° C. to 200° C. and the resulting superabsorbent flake is ground into a powder with the following polymer properties and particle size distribution.

| Polymer Properties | |
|---|---|
| 0.3 psi AUL | 13.0 g/g |
| 0.6 psi AUL | 6.0 g/g |
| CRET | 46.2 g/g |

| Particle Size Distribution | |
|---|---|
| U.S. Std. Mesh | Wgt. Percent |
| 20 | 0.1 |
| 30 | 12.2 |
| 50 | 44.6 |
| 170 | 41.7 |
| 325 | 1.0 |
| −325 | 0.3 |

EXAMPLE 2

A laboratory liquid—solid V-blender, fitted with a liquid dispersion bar (Patterson-Kelley Corp., East Stroudsburg, Pa., Model number C134200), was charged with 1.25 kg of the base polymer from Example 1. The blender was started to begin mixing, the liquid dispersion bar was engaged and a mixture comprised of 21.9 g of propylene glycol (Olin Chemical, Stamford, Conn.) and 3.12 g (0.25%) of an amine polymer-epichlorohydrin adduct as a 15% solution in water (Reten® 204LS, Hercules Incorporated, Wilmington, Del.) was added to the blender over a one minute period. The weight of the crosslinker solution (propylene glycol, water and amine polymer-epichlorohydrin adduct) was 4.25% based on the weight of polymer and the solution had a surface tension value of 50.7 dynes/cm.

After completion of the crosslinker solution addition, mixing was continued for 2 minutes. The polymer was then heated to 150° C. and held at 150° C. for 90 minutes to effect the surface crosslinking reaction and dry the polymer.

The product had the following properties and particle size distribution:

| Polymer Properties | |
|---|---|
| 0.3 psi AUL | 31.4 |
| 0.6 psi AUL | 26.9 |
| CRET | 35.8 |

| Particle Size Distribution | |
|---|---|
| U.S. Std. Mesh | Wgt. Percent |
| 20 | 0.14 |
| 30 | 31.5 |
| 50 | 52.4 |
| 170 | 15.8 |
| 325 | 0.2 |
| −325 | 0.0 |

EXAMPLE 3

The procedure used in this example is substantially identical to that used in Example 2, but the crosslinker concentration was increased to 0.375% (4.69 grams of amine polymer-epichlorohydrin adduct) and 2.125% water was added to maintain the crosslinker solution concentration the same as that of Example 2. The surface tension of the crosslinker of the solution was 49.5 dynes/cm. The product had the following properties:

| | |
|---|---|
| 0.3 psi AUL | 32.9 |
| 0.6 psi AUL | 22.0 |
| CRET | 38.1 |

EXAMPLE 4

The procedure used in this example is substantially identical to that used in Example 2, but the crosslinker concentration was increased 0.5% (amine polymer-epichlorohydrin adduct) and 2.0% water was added to maintain the amount of the crosslinker solution; the same as that of Example 2. The crosslinker solution's surface tension was 50.1 dynes/cm. The product had the following properties:

| | |
|---|---|
| 0.3 psi AUL | 31.5 |
| 0.6 psi AUL | 26.3 |
| CRET | 35.7 |

EXAMPLE 5

The procedure used in this example is substantially identical to that used in Example 2, but the crosslinker solution contained 0.97% crosslinker (amine polymer-epichlorohydrin adduct) and 1.59% water was added to maintain the crosslinker solution concentration the same as that of Example 2. The crosslinker solution's surface tension was 48.8 dynes/cm. The product had the following properties:

| | |
|---|---|
| 0.3 psi AUL | 32.4 |
| 0.6 psi AUL | 25.5 |
| CRET | 36.8 |

The following Table 1 summarizes the data of examples 1–5. In all examples, the amount of crosslinker solution was 4.25 weight percent based on the weight of polymer and the diol was propylene glycol.

TABLE 1

(Examples 1–5)

| Ex. | % XL | % PG | % Water | σ | 0.3 AUL | 0.6 AUL | CRET |
|---|---|---|---|---|---|---|---|
| 1 | 0 | 0 | 0 | 0 | 13 | 6 | 46.2 |
| 2 | 0.25 | 1.75 | 2.25 | 50.7 | 31.4 | 26.9 | 35.8 |
| 3 | 0.375 | 1.75 | 2.125 | 49.5 | 32.9 | 22.0 | 38.1 |
| 4 | 0.50 | 1.75 | 2.0 | 50.1 | 31.5 | 26.3 | 35.7 |
| 5 | 0.97 | 1.69 | 1.59 | 48.8 | 32.4 | 25.5 | 36.8 |

% XL = % crosslinker, % PG = % propylene glycol, σ = surface tension - dynes/cm, AUL = absorbency under load g/g, CRET = centrifuge retention g/g

EXAMPLE 6

This example is substantially identical to Example 3, but 21.9 g of ethylene glycol (Aldrich Chemical, Milwaukee, Wis.), was used instead of propylene glycol. The crosslinker solution's surface tension was 61.6. The product had the following properties:

| | |
|---|---|
| 0.3 psi AUL | 31.5 |
| 0.6 psi AUL | 24.8 |
| CRET | 36.8 |

Although the polymer absorbency properties were good; the ethylene glycol caused the polymer particles to swell and particles agglomerated into undesired large particles.

EXAMPLE 7

The procedure used in this example is substantially identical to that used in Example 3, but 21.9 g of 1,3-butanediol (Aldrich Chemical, Milwaukee, Wis.), was used instead of propylene glycol. The crosslinker solution's surface tension was 50.1 dynes/cm. The product had the following properties:

| | |
|---|---|
| 0.3 psi AUL | 32.8 |
| 0.6 psi AUL | 23.5 |
| CRET | 38.8 |

EXAMPLE 8

This example is substantially identical to Example 3, but 21.9 g of 1,5-pentandiol (Aldrich Chemical, Milwaukee, Wis.), was used instead of propylene glycol. The crosslinker solution's surface tension was 43. The product had the following properties:

| | |
|---|---|
| 0.3 psi AUL | 31.7 |
| 0.6 psi AUL | 20.7 |
| CRET | 37.9 |

The following Table 2 summarizes the data of examples 6, 7 & 8. The data of Example 3 is also included for reference. These examples had the following common factor: crosslinker solution –4.25%; crosslinker concentration –0.375%; diol concentration –1.75%; and water concentration –2.125%. All percentages are weight percent based on the weight of polymer.

TABLE 2

(Examples 3, 6–8)

| Ex. | Solvent | Surface Tension | 0.3 AUL | 0.6 AUL | CRET |
|---|---|---|---|---|---|
| 3 | PG | 49.5 | 32.9 | 22.0 | 38.1 |
| 6* | EG | 61.6 | 31.5 | 24.8 | 36.8 |
| 7 | BD | 50.1 | 32.8 | 23.5 | 38.8 |
| 8 | PD | 43 | 31.7 | 20.7 | 37.9 |

* = excessive particle agglomeration observed, PG = propylene glycol, EG = ethylene glycol, BD = butanediol, PD = pentanediol

EXAMPLE 9

The procedure used in this example is substantially identical to that used in Example 3, but the crosslinker solution contained 40.63 g propylene glycol (3.25%); 4.75 g (0.38%) of amine polymer-epichlorohydrin adduct (Kymeme® 736; Hercules Incorporated, Wilmington, De.; 38% solution in water), 7.75 g (0.62%) water. The amount of crosslinker solution was 4.25 weight percent based on polymer and it had a surface tension was 42.7. The product had the following properties:

| | |
|---|---|
| 0.3 psi AUL | 33.2 |
| 0.6 psi AUL | 20.6 |
| CRET | 38.8 |

EXAMPLE 10

The procedure for this example is substantially identical to that used in Example 9, but the amount of propylene glycol was decreased to 18.8 g (1.5%). The crosslinker solution was 2.5 weight percent based on polymer and it had a surface tension of 44.3. The product had the following properties:

| | |
|---|---|
| 0.3 psi AUL | 33.2 |
| 0.6 psi AUL | 28.2 |
| CRET | 36.0 |

EXAMPLE 11

The procedure for this example is substantially identical to that used in Example 9, but the propylene glycol amount was decreased to 12.5 g (1.0%). The crosslinker solution was 2.0 weight percent based on polymer and it had a surface tension of 46.2. The product had the following properties:

| | |
|---|---|
| 0.3 psi AUL | 34.6 |
| 0.6 psi AUL | 28.9 |
| CRET | 37.6 |

EXAMPLE 12

The procedure for this example was substantially identical to that used in Example 9, but the amount of propylene glycol was reduced to 6.25 g (0.5%). The amount of crosslinker solution was 1.5 percent by weight of polymer and it had surface tension of 50.2. The product had the following properties:

| 0.3 psi AUL | 34 |
|---|---|
| 0.6 psi AUL | 16 |
| CRET | 41 |

Table 3 summarizes the data of Examples 9–12. In these examples, the amount of crosslinker and water was held constant at 0.38% and 0.62% respectively. The amount of propylene glycol was progressively reduced. At a propylene glycol level less than 1.0 weight, the 0.6 psi decreased to 16 g/g.

TABLE 3

(Examples 9–12)

| Ex. | % PG | % XL Solution | σ | 0.3 AUL | 0.6 AUL | CRET |
|---|---|---|---|---|---|---|
| 9 | 3.25 | 4.25 | 42.7 | 33.2 | 20.6 | 38.8 |
| 10 | 1.5 | 2.5 | 44.3 | 33.2 | 28.2 | 36.0 |
| 11 | 1.0 | 2.0 | 46.2 | 34.6 | 28.9 | 37.6 |
| 12 | 0.5 | 1.5 | 50.2 | 34.0 | 16.0 | 41.0 |

% PG - % propylene glycol, % XL = % crosslinker solution, σ = surface tension - dynes/cm, AUL = absorbency under load g/g, CRET = centrifuge retention g/g

EXAMPLES 13–15

The procedure of Example 3 was repeated except the propylene glycol was progressively reduced from 1.0% to 0.5% to 0% while the crosslinking solution amount was held at 4.25%. Table 4 summarizes the results of these experiments.

TABLE 4

(Examples 13–15)

| Ex. | % PG | % Water | σ | 0.3 AUL | 0.6 AUL | CRET |
|---|---|---|---|---|---|---|
| 13 | 1.0 | 2.88 | 56.9 | 32.9 | 14 | 39.3 |
| 14 | 0.5 | 2.38 | 63.3 | 12.4 | 8.5 | 43.2 |
| 15 | 0.0 | 3.88 | 74.7 | 9.4 | 8.0 | 44.8 |

% PG = % propylene glycol, σ = surface tension - dynes/cm, AUL absorbency under load g/g, CRET = centrifuge retention g/g These examples illustrate the necessity to maintain the surface tension of the crosslinker solution below about 55 dynes/cm.

EXAMPLES 16–18

The procedure for Example 3 was substantially repeat except butanediol (butylene glycol) was used instead of propylene glycol. The amount of butylene glycol was progressively reduced from 1.5% to 1.0% to 0.5%. Table 5 summarizes the results of these experiments. The amount of crosslinker solution was maintained at 4.25% and the crosslinker at 0.375%.

TABLE 5

(Examples 16–18)

| Ex. | % BG | % Water | σ | 0.3 AUL | 0.6 AUL | CRET |
|---|---|---|---|---|---|---|
| 16 | 1.5 | 2.38 | 51.4 | 32.9 | 26.7 | 36.5 |
| 17 | 1.0 | 2.88 | 55.1 | 33.3 | 26.3 | 37.8 |
| 18 | 0.5 | 3.38 | 60.8 | 32.8 | 18.4 | 38.5 |

% PG butylene glycol, σ = surface tension - dynes/cm, AUL = absorbency under load g/g, CRET = centrifuge retention g/g

EXAMPLE 19

The procedure of Example 3 was substantially repeated except the crosslinker was diethylene glycol diglycidyl ether (MW 224) and the weight percent of the crosslinker solution was 3.95% and the amount of crosslinker was 0.33%. The crosslinker solution's surface tension was 49.8. The product had the following properties:

| 0.3 psi AUL | 34 |
|---|---|
| 0.6 psi AUL | 28.8 |
| CRET | 33.8 |

EXAMPLE 20

The procedure of Example 3 was substantially repeated except the propylene glycol was replaced with an equal amount of glycerine. The crosslinker solution had a surface tension of 70.2 dynes per centimeter. The resulting polymer had the following properties:

| 0.6 psi AUL | 11.2 |
|---|---|
| 0.3 psi AUL | 19.1 |
| CRET | 41.2 |

EXAMPLE 21

The products of Example 1 and Example 2 were analyzed to determine the dust content of each product. Twenty grams of product was slowly added to a 500 ml vacuum flask via a funnel having a 150 mm diameter and a 230 mm height. The vacuum port of the flask was connected to a Model P-5 Digital Dust Analyzer manufactured by Sibata Scientific Technology Ltd., Tokyo, Japan, and distributed by MDA Instruments, Lincolnshire, IL. The dust analyzer was calibrated for background atmospheric dust levels in the standard manner prior to addition of the test sample. The dust content of each sample was measured at one minute after completion of the sample addition to the flask. An average of three tests is reported below for each sample in dust counts per minute (CPM).

| | Dust Content |
|---|---|
| Example 1 | 13.3 ± 3.2 cpm |
| Example 2 | 1.7 ± 0.6 cpm |

Additionally it has been found that a $C_3$–$C_6$ diol can be used to reduce the dust content of superabsorbent polymer compositions. Optionally the diol may be applied as an aqueous solution. The amount of diol employed depends, in part, upon the equipment used to effect dispersion of the diol on the superabsorbent polymers and the amount of dust present in the composition.

Generally, the effective amount of diol will be between 0.1 to about 1 weight percent; preferably about 0.3 to about 0.6 weight percent. An equal amount of water may be used to facilitate the dispersion. However, the addition of water may be necessitate drying the polymer to remove undesired moisture.

EXAMPLE 22

This example illustrates treating a superabsorbent polymer composition with an aqueous solution of propylene glycol in an amount of about 1% of glycol and about 1% of water.

1750 parts of SANWET® IM-3900 water absorbing resin (Lot #32204) were placed into a Patterson-Kelley laboratory-size V-Blender. An organic aqueous solution, 17.5 parts of propylene glycol and 17.5 parts of D.I. water, was sprayed onto the superabsorbent polymer powder and uniformly mixed. The resulting mixture was heated for about 30 minutes at 130° C.

Airborne dust content of the resulting superabsorbent polymer was determined by Digital Dust Indicator, Model P-5, manufactured by Sibata Scientific Technology, Ltd. and is reported in dust counts per minute.

Absorption properties of the resulting superabsorbent polymer were analyzed by absorbency under load (AUL) method at 0.3 psi. Comparative results are listed as follows:

| Polymer | Dust Count | AUL (g/g) |
| --- | --- | --- |
| Before | 157 ± 20 | 25.7 ± 1.0 |
| After | 3 ± 1 | 28.3 ± 1.6 |

EXAMPLE 23

The procedure of Example 22 is substantially repeated except the amount of propylene glycol was reduced to 0.4% based upon the weight of the polymer and the water concentration was reduced to zero. A similar low dust content (4 cpm) is obtained on the treated polymer.

The superabsorbent polymers of this invention are useful in the manufacture of moisture absorbent articles, such as disposable diapers, sanitary napkins, incontinence garments, bandages, and the like. The superabsorbent compositions of this invention are particularly useful in the manufacture of thin and ultra thin disposable diapers which have excellent moisture absorbance capacity, fluid distribution properties and reduced leakage.

In making absorbent articles with the compositions of this invention, the superabsorbent composition may be mixed with, attached to, layered in, or dispersed in a porous matrix of fibers. Such matrices are made with hydrophilic fibers such as wood pulp or fluff, cotton liners, and synthetic fibers or a mixture of the fibers and the wood fluff. The fibers can be loose or joined as in nonwovens. The synthetic fibers can be polyethylene, polypropylene, polyesters, copolymers of polyesters and polyamides and the like. The synthetic fibers may be meltblown fibers or fibers which have been treated to render them hydrophilic. Additionally, the superabsorbent polymers of the invention may be incorporated in the absorbent article in a compartment or localized area of the absorbent structure.

Absorbent articles, such as disposable diapers, are made with a liquid-impermeable backing material, a liquid-permeable bodyside facing material and the liquid-absorbing composite sandwiched between the backing material and the facing material. The liquid-impermeable backing material can be made from commercially available polyolefin film and the liquid-permeable facing material can be made from a commercially available nonwoven material, such as spunbonded or corded fibrous web which is wettable and capable of passing urine.

The absorbent articles of the invention may comprise from about 5% to about 90% by weight of the superabsorbent polymers of the invention. In a typical absorbent article, the superabsorbent polymer of the invention may be dispersed in a fiber matrix in which the superabsorbent is present in an amount from about 30 to 70 weight percent and the fiber matrix comprising 70 to 30 weight percent of the article. In another form of absorbent article, the superabsorbent may be present in a containment structure in which the superabsorbent polymer is present in an amount of about 30 to 90 percent by weight. Combinations of dispersed superabsorbent polymer and contained superabsorbent polymer are also known.

The superabsorbent polymers of this invention can be used in the manufacture of absorbent articles such as those described in U.S. Pat. Nos. 3,669,103; 3,670,731; 4,654,039; 4,699,823; 4,430,086; 4,973,325; 4,892,598; 4,798,603; 4,500,315; 4,596,567; 4,676,784; 4,938,756; 4,537,590; 4,935,022; 4,673,402; 5,061,259; 5,147,343; 5,149,335; and 5,156,902; the teachings of which are hereby incorporated by reference.

We claim:

1. A superabsorbent polymer having a 0.6 psi AUL value of at least 25 g/g and a centrifuge retention value of at least 35 g/g wherein said superabsorbent polymer is the product of a process which comprises dispersing an aqueous solution of $C_3$–$C_6$ diol and a crosslinking compound having at least two reactive, functional groups onto a crosslinked, partially neutralized, carboxyl or carboxylate group base polymer having a 0.3 psi AUL value of 15 g/g or less and heating said dispersion to crosslink said polymer wherein said aqueous solution has a surface tension not greater than about 55 dynes per cm.

2. A superabsorbent polymer according to claim 1 wherein said base polymer is a partially neutralized polyacrylic acid polymer.

3. A superabsorbent polymer according to claim 1 wherein said base polymer has a centrifuge retention value of at least 40 g/g.

4. A superabsorbent polymer according to claim 1 wherein said base polymer is a copolymer of acrylic acid and a water soluble hydroxy group polymer.

5. A superabsorbent polymer according to claim 1 wherein said $C_3$–$C_6$ diol is propylene glycol and the surface tension of said aqueous solution is not greater than about 50 dynes per cm.

6. A superabsorbent polymer according to claim 1 wherein said crosslinking compound is selected from the group consisting of diglycidyl ether compounds, polyamide-epichlorohydrin adducts, polyamine epichlorohydrin adducts and amine polymer-epichlorohydrin adducts.

7. A superabsorbent polymer according to claim 1 wherein said crosslinking compound is an amine polymer-epichlorohydrin adduct wherein at least 50 mole percent of the reactive groups of said adduct are the azetidinium group.

8. A superabsorbent polymer according to claim 1 wherein said crosslinking compound is an amine polymer-epichlorohydrin adduct wherein about 90 mole percent of the reactive groups of said adduct are the azetidinium group.

9. A process for preparing a superabsorbent polymer which comprises dispersing an aqueous solution of a $C_3$–$C_6$ diol and a crosslinking compound onto the surface of a crosslinked, partially neutralized, carboxyl or carboxylate base polymer having a 0.3 psi AUL value of 15 g/g or less and heating the mixture to crosslink said polymer wherein said aqueous solution has a surface tension not greater than about 55 dynes per cm and wherein said aqueous solution comprises from about 0.5 to about 3.5 weight percent water and from about 1.0 to about 2.5 weight percent of said $C_3$–$C_6$ diol.

10. A process according to claim 9 wherein said based polymer is a partially neutralized polyacrylic acid.

11. A process according to claim 9 wherein said base polymer has a centrifuge retention value of at least 40 g/g.

12. A process according to claim 9 wherein a superabsorbent polymer according to claim 8 wherein said base polymer is a copolymer of acrylic acid and a water soluble hydroxy group polymer.

13. A process according to claim 9 wherein said $C_3$–$C_6$ diol is propylene glycol and the surface tension of said aqueous solution is not greater than about 50 dynes per cm.

14. A process according to claim 9 wherein said crosslinking compound is selected from the group consisting of diglycidyl ether compounds, polyamide-epichlorohydrin adducts, polyamine epichlorohydrin adducts and amine polymer-epichlorohydrin adducts.

15. A process according to claim 9 wherein said crosslinking compound is an amine polymer-epichlorohydrin adduct wherein at least 50 mole percent of the reactive groups of said adduct are the azetidinium group.

16. A process according to claim 9 wherein said crosslinking compound is an amine polymer-epichlorohydrin adduct wherein about 90 mole percent of the reactive groups of said adduct are the azetidinium group.

17. An absorbent article comprising from about 5 to about 90 percent by weight of a superabsorbent polymer composition according to claim 1 and about 10 to about 95 percent by weight of a hydrophilic fiber.

18. An absorbent article comprising from about 30 to about 90 percent by weight of a superabsorbent polymer composition according to claim 1 and about 10 to about 70 percent by weight of a hydrophilic fiber.

19. An absorbent article comprising from about 30 to about 70 percent by weight of a superabsorbent polymer composition according to claim 1 and about 30 to about 70 percent by weight of a hydrophilic fiber.

20. A superabsorbent polymer according to claim 1 wherein said crosslinking compound is diethylene glycol diglicidyl ether.

* * * * *